United States Patent
Park (10) Patent No.: US 7,458,610 B2
(45) Date of Patent: Dec. 2, 2008

(54) ROLLER D-RING FOR SEAT BELT OF VEHICLE AND METHOD FOR ASSEMBLING THE SAME

(75) Inventor: Deug Won Park, Inchun-si (KR)

(73) Assignee: Hyundai Mobis Co., Ltd., Yongin-shi (KR)

(*) Notice: Subject to any disclaimer, the term of this patent is extended or adjusted under 35 U.S.C. 154(b) by 205 days.

(21) Appl. No.: 10/990,550

(22) Filed: Nov. 18, 2004

(65) Prior Publication Data

US 2006/0038392 A1 Feb. 23, 2006

(30) Foreign Application Priority Data

Aug. 17, 2004 (KR) ...................... 10-2004-0064830

(51) Int. Cl.
*B60R 22/00* (2006.01)
(52) U.S. Cl. .................................... 280/808; 280/801.1
(58) Field of Classification Search ............. 280/801.1, 280/801.2, 808; 297/464, 468, 482, 483, 297/486; 24/163 R, 197, 198
See application file for complete search history.

(56) References Cited

U.S. PATENT DOCUMENTS

| | | | | |
|---|---|---|---|---|
| 3,981,052 | A * | 9/1976 | Pilarski | 24/163 R |
| 4,101,171 | A * | 7/1978 | Sasaki et al. | 297/483 |
| 4,349,217 | A * | 9/1982 | Fohl | 280/808 |
| 4,650,214 | A * | 3/1987 | Higbee | 280/808 |
| 4,993,746 | A * | 2/1991 | Hagelthorn | 280/806 |
| 5,286,057 | A * | 2/1994 | Forster | 280/808 |
| 5,346,152 | A * | 9/1994 | Fohl | 242/371 |
| 5,415,432 | A * | 5/1995 | Thomas | 280/808 |
| 5,673,936 | A * | 10/1997 | Mondel | 280/808 |
| 5,775,732 | A * | 7/1998 | Grau | 280/808 |
| 6,217,070 | B1 * | 4/2001 | Kopetzky et al. | 280/808 |
| 6,533,322 | B2 * | 3/2003 | Janz | 280/808 |

FOREIGN PATENT DOCUMENTS

| | | | |
|---|---|---|---|
| DE | 3414917 | A1 * | 12/1985 |
| DE | 19913423 | C1 * | 5/2000 |
| JP | 2000-025566 | | 1/2000 |

OTHER PUBLICATIONS

English Language Abstract of JP 2000-025566.
U.S. Appl. No. 10/990,554 to Park, filed Nov. 18, 2004.

* cited by examiner

*Primary Examiner*—Eric Culbreth
(74) *Attorney, Agent, or Firm*—Greenblum & Bernstein, P.L.C.

(57) ABSTRACT

A roller D-ring for a seat belt of a vehicle including a cylindrical roller, and a body having a folded structure to hold the roller by a folding portion of the body while allowing the roller to be rotatable. The folded structure is formed in a state in which the roller is seated on the folding portion of the body. The body defines, together with a peripheral surface of the roller, a gap, through which a webbing of the seat belt passes. Since the roller D-ring includes only two constituent elements, that is, the body and the roller, it is possible to reduce the manufacturing costs in accordance with a reduced number of constituent elements.

14 Claims, 8 Drawing Sheets

ROLLER D-RING FOR SEAT BELT OF VEHICLE AND METHOD FOR ASSEMBLING THE SAME

BACKGROUND OF THE INVENTION

1. Field of the Invention

The present invention relates to a roller D-ring for a seat belt of a vehicle, and, more particularly, to a roller D-ring for a seat belt of a vehicle, in which a roller is simply and conveniently mounted to a D-ring body in accordance with a folded structure of the D-ring body, so that the assembly process is simple and convenient, and the number of constituent elements is reduced.

2. Description of the Related Art

In general, seat belts are installed in the passenger compartment of a vehicle to restrain the driver and passengers in their seats, and thus, to prevent the driver and passengers from being abruptly projected from their seats by an impact generated in the event of a crash.

Figure 1:
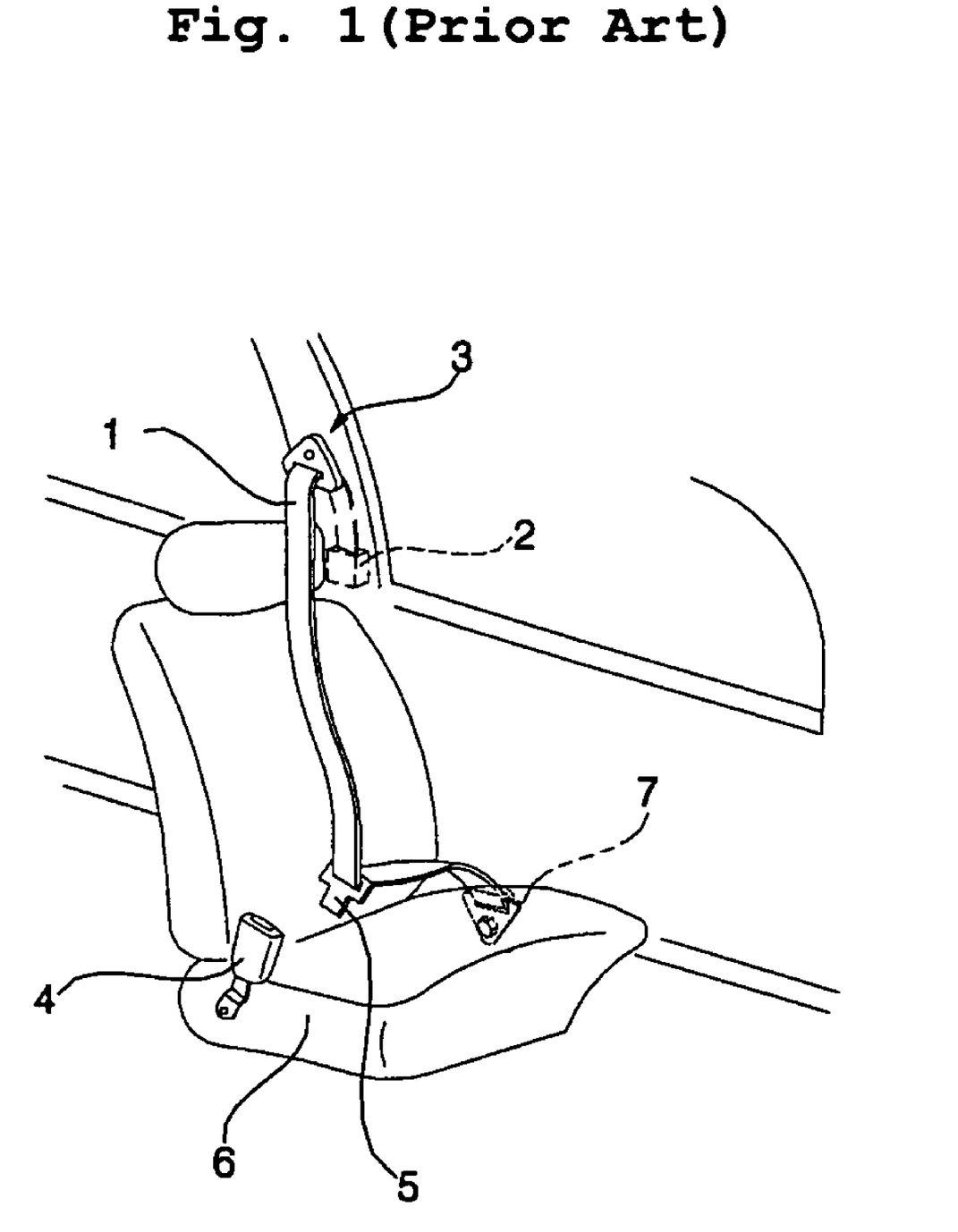
FIG. 1 is a perspective view illustrating a conventional seat belt of a vehicle.

FIG. 1 is a perspective view illustrating a conventional seat belt of a vehicle.

As shown in FIG. 1, the conventional seat belt, which is installed in the vehicle to protect the occupant during a crash or overturn, includes a webbing 1 to traverse the body of the occupant, a retractor 2 to wind the webbing 1 in a tensed state and to prevent the webbing 1 from being abruptly unwound during a vehicle crash, and a D-ring 3 to guide the webbing 1 during a winding or unwinding operation of the webbing 1 carried out by the retractor 2 such that the webbing 1 moves along the shoulder of the occupant. The conventional seat belt also includes a buckle 4 fixedly mounted to a seat 6 at a position opposite to the D-ring 3 with reference to the occupant, and a tongue 5 arranged at an intermediate portion of the webbing 1 and adapted to be coupled with the buckle 4.

One end of the webbing 1 is fixed to the retractor 2 so that the webbing 1 can be retracted into and protracted from the retractor 2. The other end of the webbing 1 is fixed to a body of the vehicle at the same side as the retractor 2 by an anchor 7.

The buckle 4 is mounted to the seat 6 at a position opposite to the anchor 7 with reference to the seat 6.

When the occupant couples the tongue 4 to the buckle 4 after sitting in the seat 6, the breast and knees of the occupant are restrained by the webbing 1.

A conventional D-ring, which may be used for the seat belt having the above-mentioned structure, is disclosed in Japanese Patent Laid-open Publication No. 2000-025566.

Figure 2:
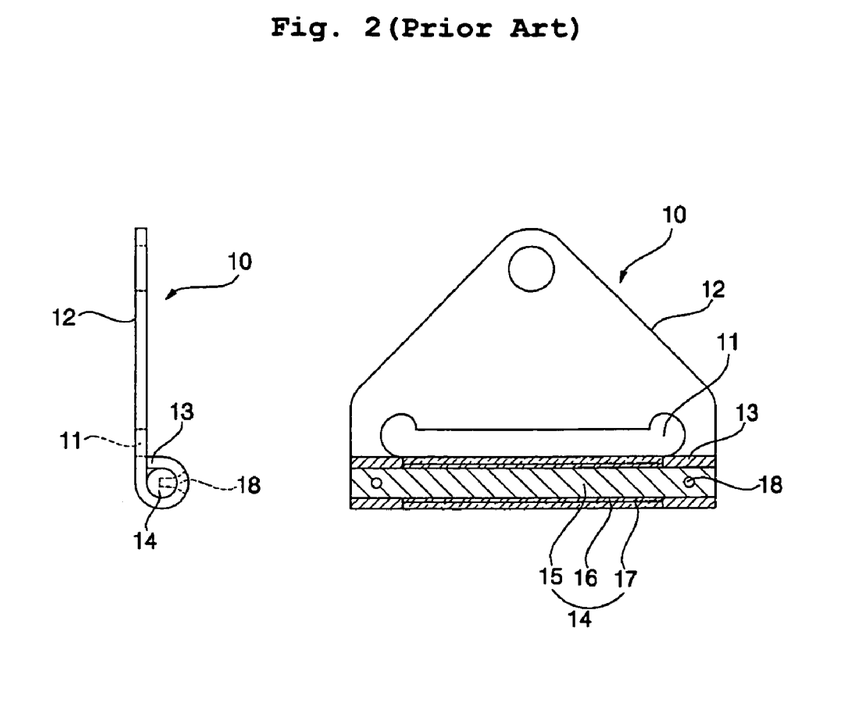
FIG. 2 is a partially-broken front view of a conventional D-ring, together with a corresponding side view.

The D-ring, which is designated by reference numeral 10 in FIG. 2, includes a body 12, and a roller 14 mounted to the body 12.

The roller 14 includes a fixed roller body 15, a rubber layer 16 formed around a peripheral surface of the fixed roller body 15, and a plastic layer 17 formed around a peripheral surface of the rubber layer 16.

The rubber layer 16 and plastic layer 17 are adapted to reduce frictional force generated from the webbing 1 when the webbing 1 comes into contact with the plastic layer 17.

The body 12 is circularly bent at one end thereof so that the roller 14 is held by the bent portion of the body 12. In the state in which the roller 14 is held by the bent portion of the body 12, screws 18 are fastened to the body 12 through the roller 14. Thus, the roller 14 is retained in the body 12.

Although the conventional D-ring 10 uses the roller 14 for reduction of frictional force, it still has a problem in that the roller 14 comes into frictional contact with the webbing 1 during the retraction and protraction of the webbing 1 through a slot 11 formed at the body 12, thereby interfering with the retraction and protraction of the webbing 1.

Furthermore, the conventional D-ring 10 requires an increased number of manufacturing processes due to the provision of the roller 14, so that an increase in manufacturing costs occurs.

Since the roller 14 is retained in the body, 12 by means of the screws 18 in the conventional D-ring 10, it is also necessary to use a process for fastening the screws 18.

SUMMARY OF THE INVENTION

The present invention has been made in view of the above-mentioned problems incurred with the related art, and it is an object of the invention to provide a roller D-ring for a seat belt of a vehicle which can minimize generation of friction during retraction/protraction of a webbing while having a simple structure to achieve simple and convenient manufacturing and assembling processes, and a method for assembling the roller D-ring.

In accordance with the present invention, this object is accomplished by providing a roller D-ring for a seat belt of a vehicle comprising: a cylindrical roller; and a body having a folded structure to hold the roller by a folding portion of the body while allowing the roller to be rotatable, the folded structure being formed in a state in which the roller is seated on the folding portion of the body, the body defining, together with a peripheral surface of the roller, a gap, through which a webbing of the seat belt passes.

Since the roller D-ring includes only two constituent elements, that is, the body and the roller, it is possible to reduce the manufacturing costs in accordance with a reduced. number of constituent elements.

In addition, since the roller D-ring has a simple structure, the failure or damage of the roller D-ring is reduced. Accordingly, the operational reliability of the roller D-ring is enhanced.

Also, since the roller D-ring has a simple structure, the assembly process is simple and convenient, so that an enhancement in productivity is achieved.

BRIEF DESCRIPTION OF THE DRAWINGS

The above objects, and other features and advantages of the present invention will become more apparent after reading the following detailed description when taken in conjunction with the drawings, in which.

DESCRIPTION OF THE PREFERRED EMBODIMENTS

Hereinafter, exemplary embodiments of a roller D-ring for a seat belt of a vehicle will be described with reference to the annexed drawings.

Although a number of embodiments may be implemented for the roller D-ring according to the present invention, the following description will be given in conjunction with the most preferable embodiment.

Figure 3:
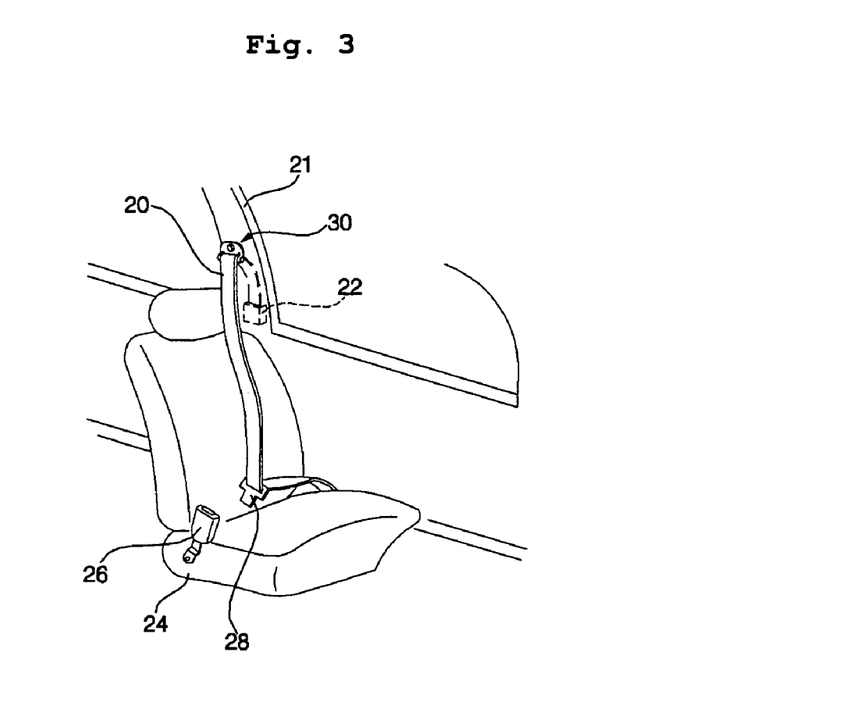
FIG. 3 is a perspective view illustrating the passenger compartment of a vehicle, to which a roller D-ring according to a first embodiment of the present invention is applied.
Figure 4:
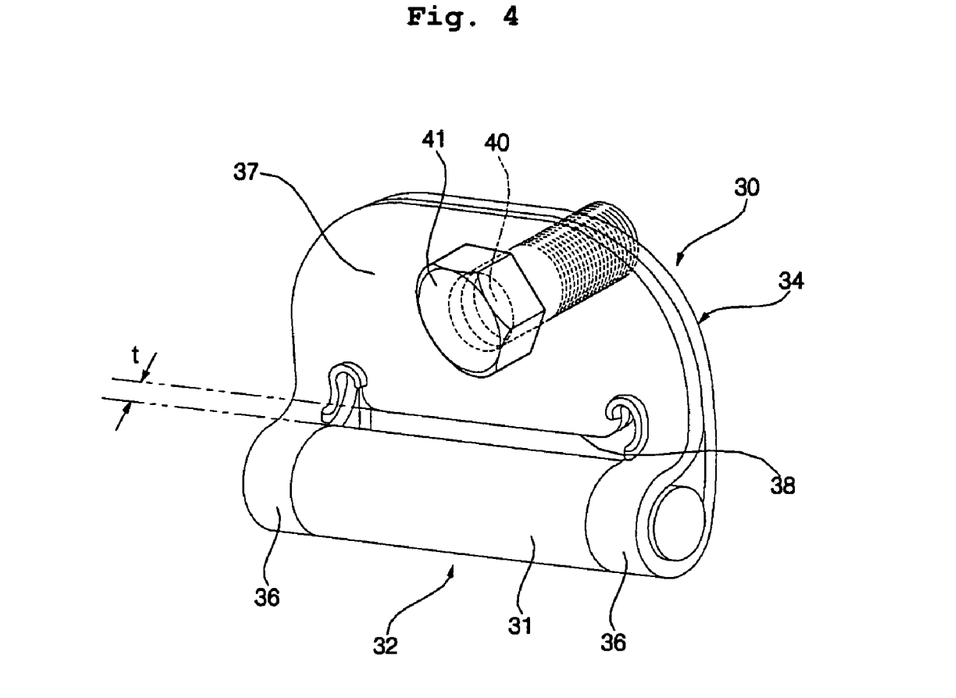
FIG. 4 is an assembled perspective view of the roller D-ring according to the first embodiment of the present invention.
Figure 5:
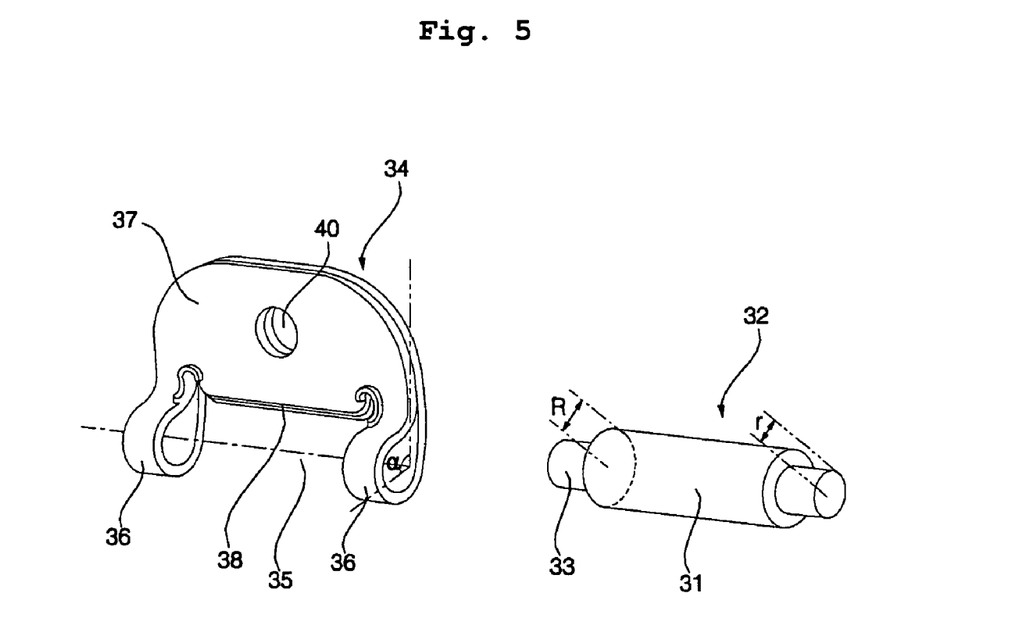
FIG. 5 is an exploded perspective view of the roller D-ring according to the first embodiment of the present invention in a folded state.
Figure 6:
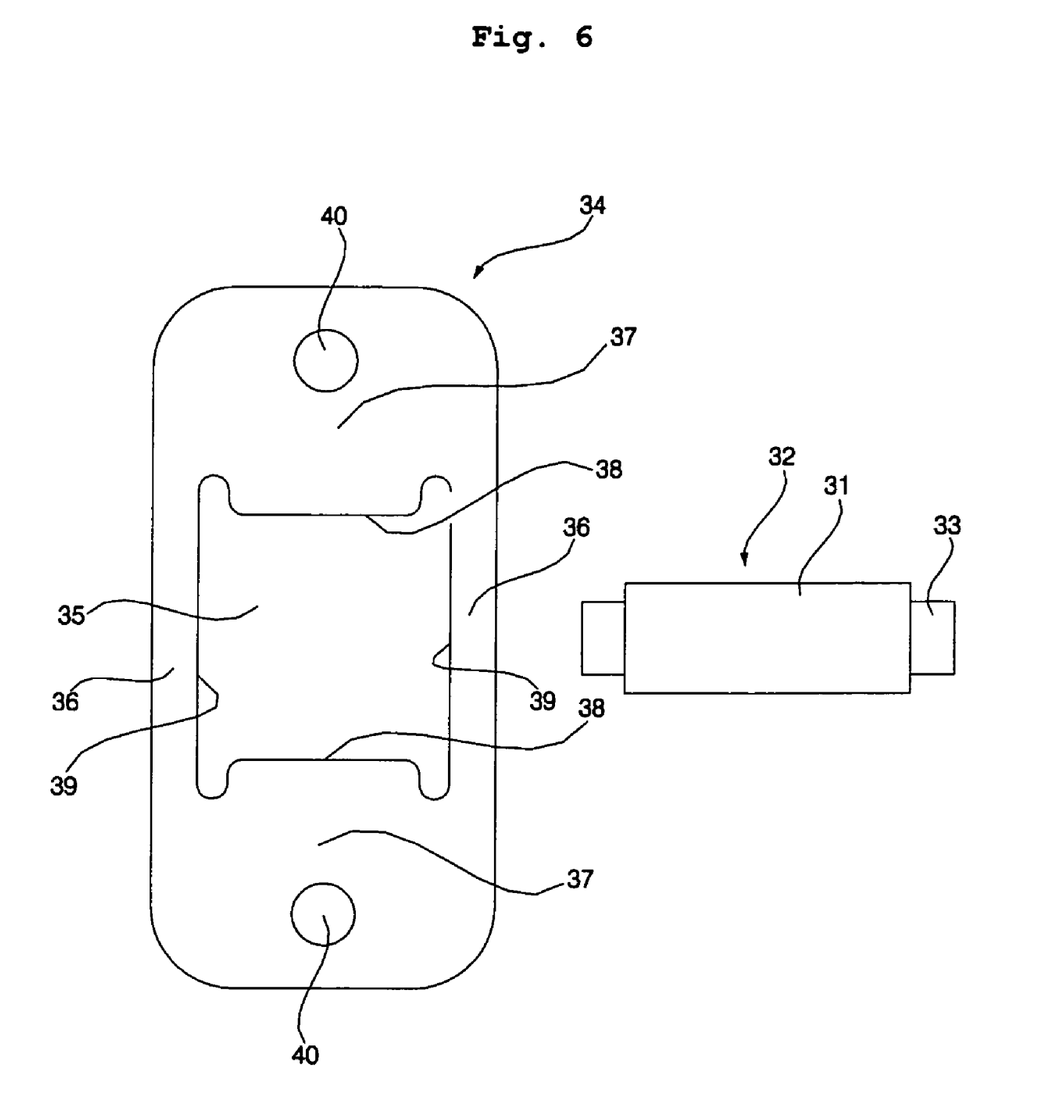
FIG. 6 is an exploded perspective view of the roller D-ring according to the first embodiment of the present invention in an unfolded state.

FIG. 3 is a perspective view illustrating the passenger compartment of a vehicle, to which a roller D-ring according to a first embodiment of the present invention is applied. FIG. 4 is an assembled perspective view of the roller D-ring according to the first embodiment of the present invention. FIG. 5 is an exploded perspective view of the roller D-ring according to the first embodiment of the present invention in a folded state. FIG. 6 is an exploded perspective view of the roller D-ring according to the first embodiment of the present invention in an unfolded state.

As shown in FIG. 3, the seat belt includes a webbing 20 to traverse the body of the occupant, a retractor 22 to wind the webbing 20 in a tensed state and to prevent the webbing 20 from being abruptly unwound during a vehicle crash, and a roller D-ring 30 to guide the webbing 20 during a winding or unwinding operation of the webbing 20 carried out by the retractor 22 such that the webbing 20 moves along the shoulder of the occupant. The seat belt also includes a buckle 26 fixedly mounted to a seat 24 at a position opposite to the roller D-ring 30 with reference to the occupant, and a tongue 28 arranged at an intermediate portion of the webbing 20 and adapted to be coupled with the buckle 26.

The retractor 22 is mounted in the interior of a body 21 of the vehicle. The vehicle body 21 has a slot (not shown), through which the webbing 20 extends from the retractor 22. The webbing 20 is guided from the retractor 22 into the occupant compartment of the vehicle through the slot of the vehicle body 21 and the roller D-ring 30. The roller D-ring 30 is pivotally mounted to the vehicle body 21.

One end of the webbing 20 is fixed to the retractor 22 so that the webbing 20 can be retracted into and protracted from the retractor 22. The other end of the webbing 20 is fixedly mounted to an anchor (not shown) fixed to the vehicle body 21 in the occupant compartment.

As shown in FIGS. 4 to 6, the roller D-ring 30 according to the present invention includes a roller 32, and a body 34 having a folded structure to hold the roller 32 by a folding portion of the body 34.

The roller 32 has a double cylindrical structure having two cylindrical portions of different radiuses. That is, the roller 32 includes a roller body 31, and rolling sections 33 arranged at opposite ends of the roller body 31 while having a radius r smaller than a radius R of the roller body 31.

As shown in FIG. 6, the body 34 includes a central opening 35 to receive the roller body 31 of the roller 32 in a folded state of the body 34, holding sections 36 respectively arranged at opposite sides of the central opening 35 to hold the rolling sections 33 of the roller 32 in the folded state of the body 34, and closing sections 37 respectively arranged above and beneath the central opening 35 to come into contact with each other in the folded state of the body 34.

The closing sections 37 have edges 38 to define the opening 35 together with edges 39 of the holding sections 36. In a state in which the roller 32 is assembled in the folded body 34, the edges 38 of the closing sections 37 are spaced apart from the roller body 31 of the roller 32 by a predetermined distance to form a gap t therebetween.

The edges 39 of the holding sections 36 come into contact with opposite ends of the roller body 31, thereby preventing the roller 32 from being separated from the roller D-ring 30.

In an unfolded state thereof, the body 34 is symmetrical in a folding direction of the body 34. That is, the body 34 has symmetrical upper and lower portions as shown in FIG. 6.

The closing sections 37 are provided with mounting holes 40, respectively. The mounting holes 40 are aligned with each other when the body 34 is vertically folded. As shown, in FIG. 4, a bolt 41, which serves as a fastener, extends through the aligned mounting holes 40, and is fastened to the vehicle body 21 shown in FIG. 3.

The body 34 is pivotable about the bolt 41 in a state in which the body 34 is mounted to the vehicle body 21 by the bolt 41.

Hereinafter, a method for assembling the roller D-ring in accordance with the first embodiment of the present invention will be described with reference to FIGS. 4 to 6.

First, the body 34, which is prepared in the form of a stamped metal sheet, is vertically folded about the holding sections 36 through an angle predetermined to allow insertion of the roller 32. Thereafter, the roller 32 is inserted into the folded body 34 such that the rolling sections 33 are seated in the holding sections 36, respectively. In this state, the body 34 is further folded such that the holding sections 36 of the body 34 enclose the rolling sections 33 of the roller 32, and the closing sections 37 of the body 34 come into close contact with each other.

In this case, the holding sections 36 are formed to have a radius of curvature larger than the radius of the rolling sections 33. Also, the folding process is carried out such that the mounting holes 40 of the closing sections 37 are aligned with each other.

Subsequently, the folded body 34 is mounted to the vehicle body 21 by means of the bolt 41. In order to bring the surface of the body 34 facing the vehicle body 21 into close contact with the vehicle body 21 over a wide area, and thus, to stably seat the body 34 on the vehicle body 21, the folding of the body 34 is carried out such that the surface of the body 34 facing the vehicle body 21 is flat.

That is, the folding of the body 34 is carried out such that the holding sections 36 are not protruded toward the vehicle body 21, but have protruded portions to face the occupant compartment of the vehicle in the assembling process of the roller D-ring 30. For such a structure, the holding sections 36 have a predetermined inclination α with respect to the closing sections 37 of the body 34. The formation of the holding sections 36 to have the inclination α may be achieved through a separate process. However, it is preferred that the formation of the holding sections 36, to have the inclination α, be achieved by the process of bring the closing sections 37 of the body 34 into close contact with each other in a simultaneous manner.

In the roller D-ring 30 assembled in the above-described manner, the rolling sections 33 of the roller 32 are rotatable within the holding sections 36 of the body 34, respectively. The roller 32 comes into frictional contact with the webbing 20 when the webbing 20 of FIG. 3 passing through the gap t is retracted or protracted, so that the roller 32 is rotated.

Meanwhile, when a vehicle crash occurs, abrupt protraction of the webbing 20 is prevented by the retractor 22. At this time, a load is applied to the webbing 20 due to the inertial force of the occupant exerted in the crash direction. The load is transmitted to the roller D-ring 30 which is, in turn, rotated about the bolt 41 in a direction depending on the direction of the load, thereby reducing impact caused by the load.

Figure 7:
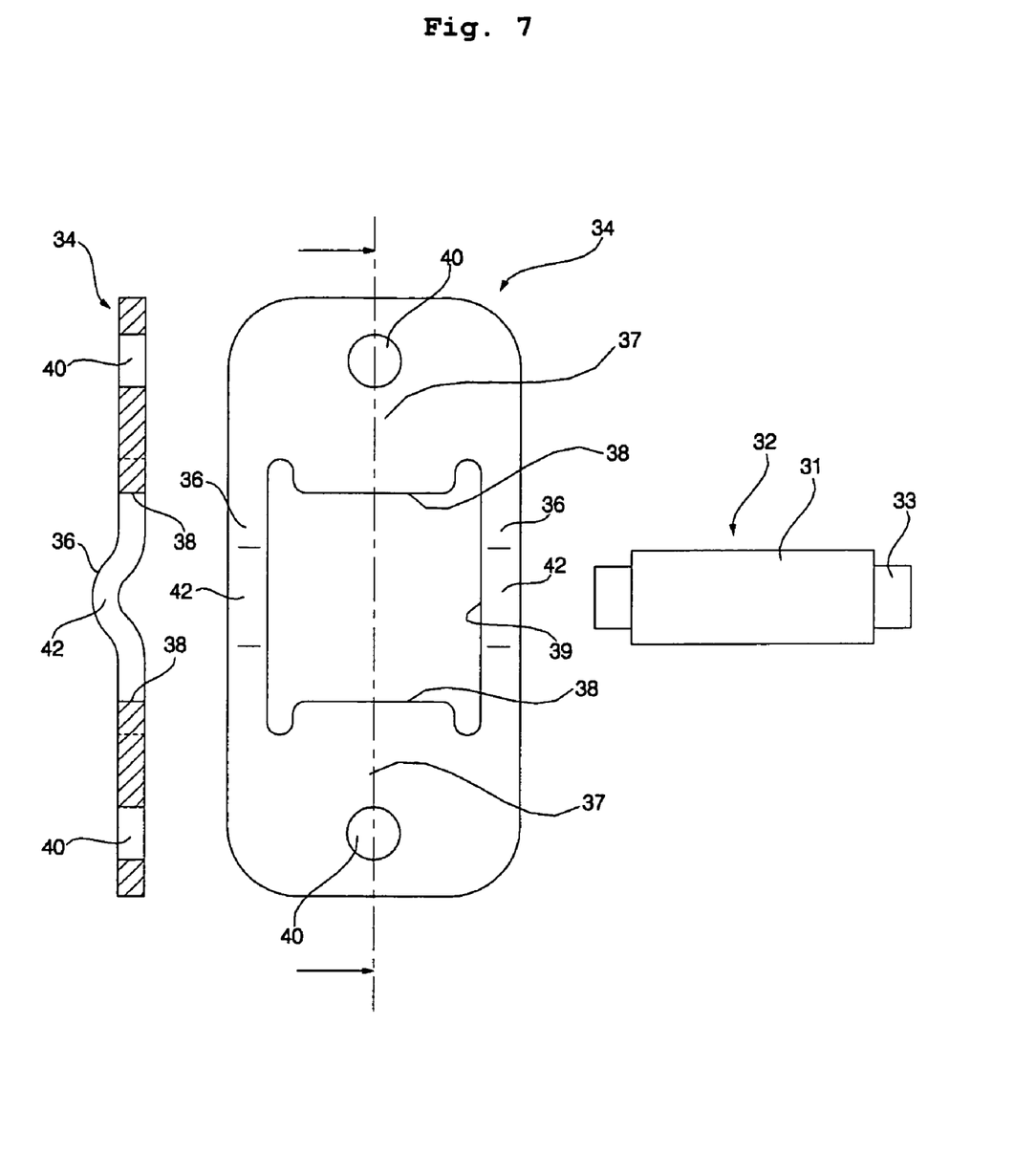
FIG. 7 is a front view illustrating a roller D-ring according to a second embodiment of the present invention, together with a corresponding side sectional view.

FIG. 7 is a front view illustrating a roller D-ring according to a second embodiment of the present invention, together with a corresponding side sectional view.

As shown in FIG. 7, the roller D-ring of the second embodiment has a body structure similar to that of the first embodiment. In accordance with the second embodiment, however, forming sections 42 are provided to more stably seat the roller 32 in the body 34.

The forming sections 42 are formed by forming the holding sections 36 into a desired shape, that is, pressing the holding sections 36 of the body 34 in a flat state to have a predetermined radius of curvature. Preferably, the radius of curvature of the holding sections 36 is larger than the radius of the rolling sections 33 of the roller 32. In this case, the opposite ends of the roller 32 are seated in respective forming sections 42, so that it is possible to prevent the roller 32 from deviating from a desired position in the body 34 during the process of folding the body 34.

Figure 8:
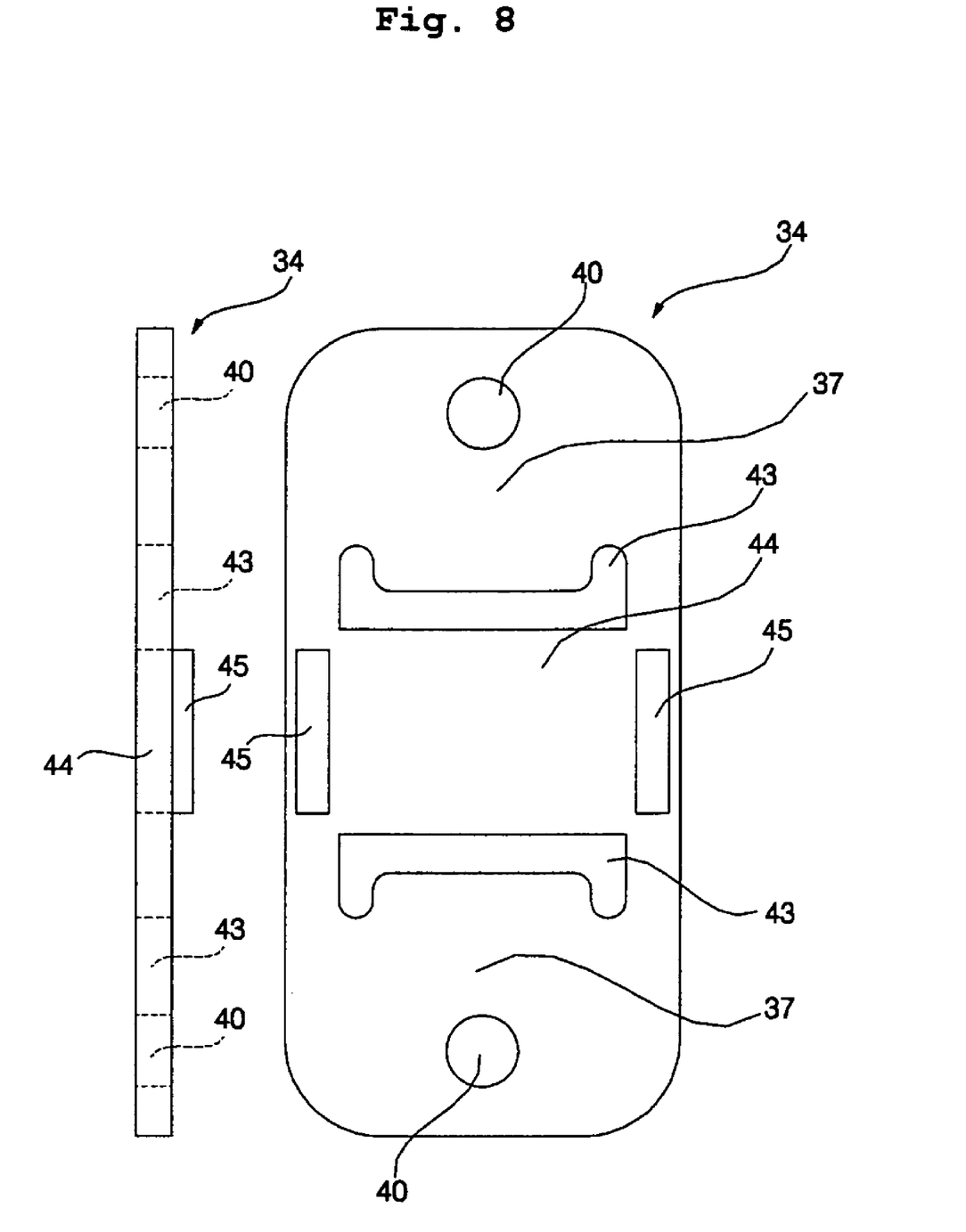
FIG. 8 is a front view illustrating a body according to a third embodiment of the present invention, together with a corresponding side view.
Figure 9:
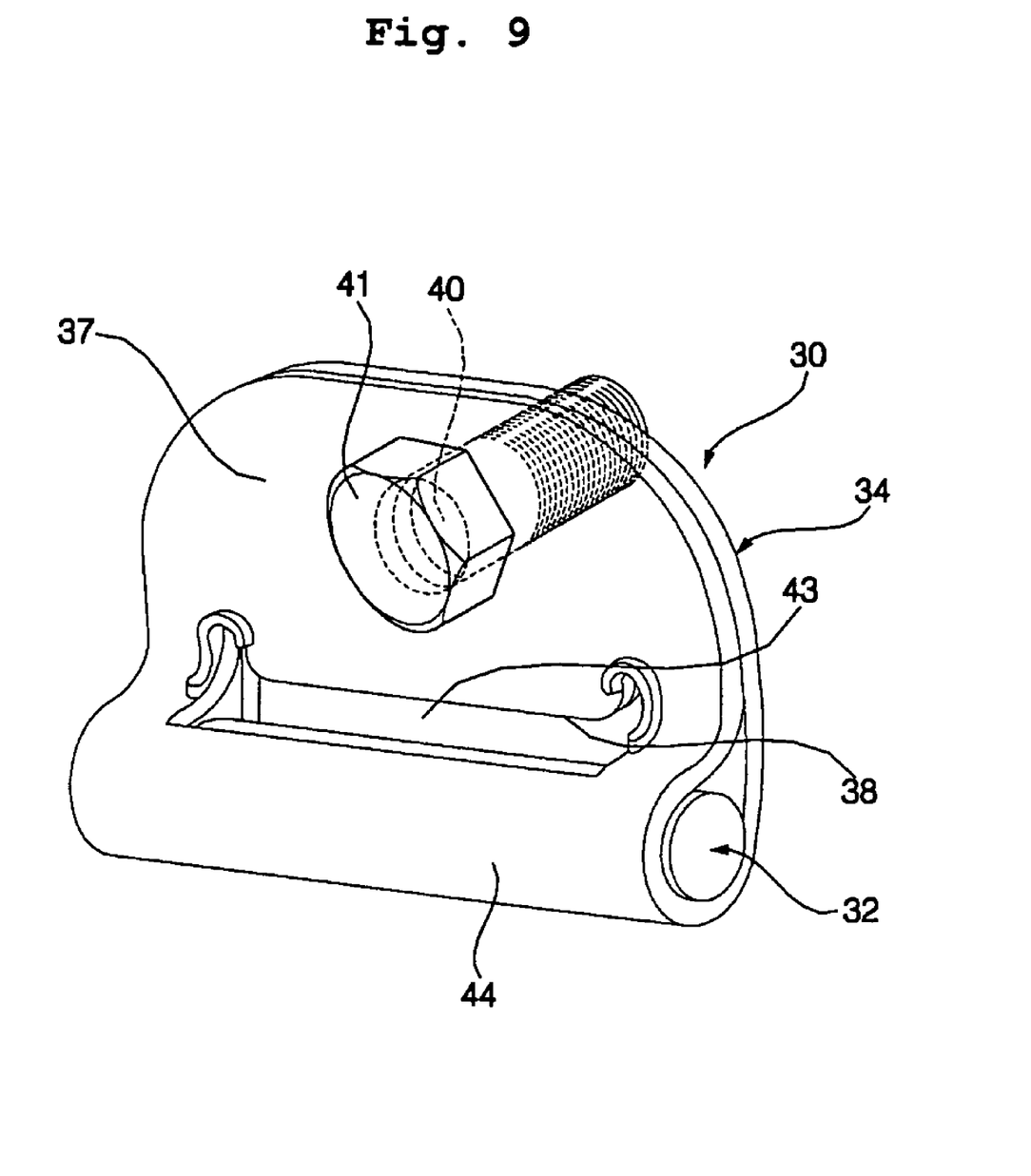
FIG. 9 is a perspective view illustrating a roller D-ring according to the third embodiment of the present invention.

FIG. 8 is a front view illustrating a body according to a third embodiment of the present invention, together with a corresponding side view. FIG. 9 is a perspective view illustrating a roller D-ring according to the third embodiment of the present invention.

As shown in FIGS. 8 and 9, the roller D-ring of the third embodiment has a structure similar to that of the first embodiment. In accordance with the third embodiment, however, the body 34 includes a pair of slots 43, through which the webbing 30 passes, a holding section 44 formed between the slots 43 to hold the roller body 31 of the roller 32, and a pair of support sections 45 respectively arranged at opposite sides of the holding section 44 to support the rolling sections 33 of the roller 32.

The slots 32 of the body 34 are vertically symmetrical so that they are aligned with each other in a folded state of the body 34. The holding section 44 is formed at a central portion of the body 34 where the body 34 is folded. In particular, the support sections 45, which are arranged at opposite sides of the holding section 44, are upwardly protruded so that the rolling sections 33 are seated on the support sections 45, respectively.

After the body 34 of the third embodiment is folded in a state in which the roller 32 is seated on the body 34, the peripheral surface of the roller 32 is mainly covered by the holding section 44, and only a portion of the peripheral surface facing the closing section 37 is exposed to come into contact with the webbing 20. During movement of the webbing 20, accordingly, the roller 32 is rotated in a state of being supported by the support sections 45.

Figure 10:
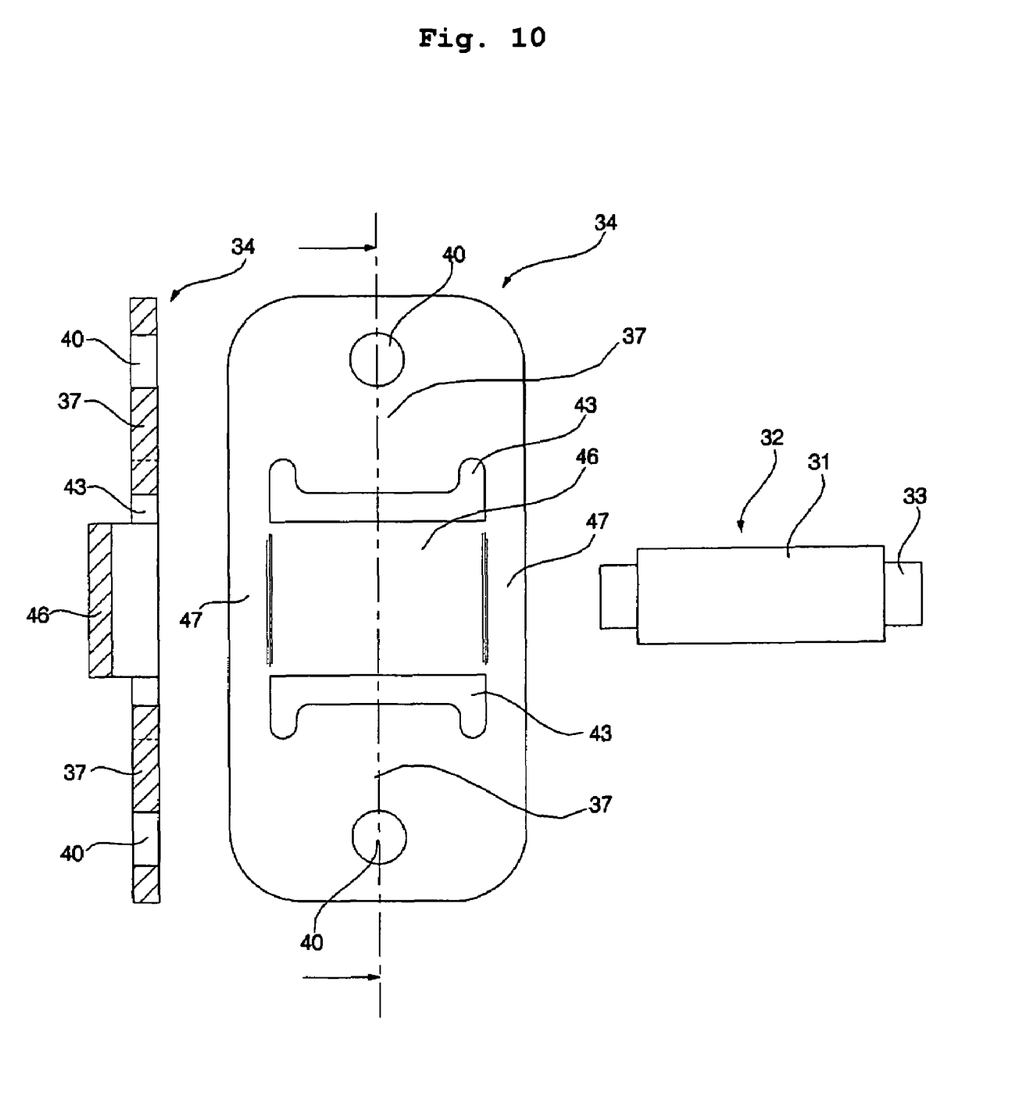
FIG. 10 is a front view illustrating a roller D-ring according to a fourth embodiment of the present invention, together with a corresponding side sectional view.

FIG. 10 is a front view illustrating a roller D-ring according to a fourth embodiment of the present invention, together with a corresponding side sectional view.

As shown in FIG. 10, the roller D-ring of the fourth embodiment has a structure similar to that of the third embodiment. In accordance with the fourth embodiment, however, the roller D-ring includes a recessed holding section 46 to hold the roller body 31 of the roller 32. In this case, the support sections 45 of the third embodiment are dispensed with.

The holding section 46 is downwardly recessed from the body 34 of a flat state. When the roller 32 is held in the holding section 46, the rolling sections 33 of the roller 32 are seated on support sections 47 arranged at opposite sides of the holding section 46, respectively. In this case, the roller body 31 of the roller 32 is spaced apart from the holding section 46 by a predetermined distance or is slidably in contact with the holding section 46.

As described above, the method for assembling the roller D-ring in accordance with the present invention includes a body bending step to bend the body 34 through an angle predetermined to allow insertion of the roller 32, a roller inserting step to insert the roller 32 into the bent body 34, and a body folding step to bring the closing sections 37 of the body 34 into contact with each other, and thus, to prevent the roller 32 from being separated from the body 34.

The body folding step may involve a bending step to bend the holding sections 36 of the body 34 toward the occupant compartment of the vehicle such that the holding sections 36 have a predetermined inclination $\alpha$ with respect to the closing sections 37, as described in conjunction with the first embodiment.

A step to form the forming sections or recessed holding sections for seating the roller may be carried out prior to the body bending step, as described in conjunction with the second through fourth embodiments.

As apparent from the above description, the roller D-ring 30 according to the present invention uses a reduced number of elements, that is, only the body 34 and the cylindrical roller 32, so that a reduction in manufacturing costs is achieved.

In accordance with the structure of the roller D-ring 30 according to the present invention, the assembly of the roller D-ring 30 is carried out under the condition in which the roller 32 is maintained in a state of being stably seated in the body 34 during the process of forming the body 34. Accordingly, it is possible to reduce the assembly time of the roller D-ring 30.

In addition, since the roller D-ring 30 according to the present invention has a simple structure, the failure or damage of the roller D-ring 30 is reduced. Accordingly, the operational reliability of the roller D-ring 30 is enhanced.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

The present disclosure relates to subject matter contained in priority Korean Application No. 2004-64830, filed on Aug. 17, 2004, which is herein expressly incorporated by reference its entirety.

What is claimed is:

1. A roller D-ring for a seat belt of a vehicle comprising:
a cylindrical roller; and
a body having a folded structure to hold the roller by a folding portion of the body while allowing the roller to be rotatable, the folded structure being formed in a state in which the roller is seated on the folding portion of the body, the body defining, together with a peripheral surface of the roller, a gap, through which a webbing of the seat belt passes,
wherein the body comprises a pair of closing sections that come into close contact with each other when the folded structure is completely formed, and a single opening provided between the pair of closing sections, to which the peripheral surface of the roller is exposed, the single opening being substantially symmetrical with respect to both an axis of the roller and a central line crossing the closing sections, such that when the body is folded so that the closing sections contact each other, a pair of spaced apart holding sections each formed at opposite sides of the single opening are entirely spaced apart by the single holding opening;

the roller including a roller body and a plurality of rolling sections provided on opposite ends of the roller body;

a diameter of at least one of the rolling sections is smaller than a diameter of the roller body; and the rolling sections are formed unitarily and in one-piece at the opposite ends of the roller body.

2. The roller D-ring according to claim 1, wherein: the gap is defined between the opening and the peripheral surface of the roller.

3. The roller D-ring according to claim 1, wherein the holding sections hold the rolling sections of the roller while allowing the roller to be rotatable, respectively, the holding sections corresponding to the folding portion of the body.

4. The roller D-ring according to claim 3, wherein the holding sections are bent toward an occupant compartment of the vehicle upon forming the folded structure.

5. The roller D-ring according to claim 4, wherein the body further includes forming sections respectively formed at the holding sections to provide seats, on which the rolling sections of the roller are seated upon forming the folded structure.

6. The roller D-ring according to claim 5, wherein the body further includes mounting holes respectively formed through the closing sections of the body and aligned with each other when the folded structure is completely formed, to allow a fastener to pass through the aligned mounting holes so that the roller D-ring is pivotally mounted in an occupant compartment of the vehicle.

7. The roller D-ring according to claim 1, wherein:

the holding sections hold the roller while allowing the roller to be rotatable, the holding sections corresponding to the folding portion of the body; and the body includes support sections respectively formed at opposite sides of the holding sections with reference to the folding direction of the body to support the rolling sections of the roller.

8. The roller D-ring according to claim 7, wherein at least one of the holding sections is bent toward an occupant compartment of the vehicle upon forming the folded structure.

9. The roller D-ring according to claim 8, wherein the body further includes mounting holes respectively formed through the closing sections of the body and aligned with each other when the folded structure is completely formed, to allow a fastener to pass through the aligned mounting holes so that the roller D-ring is pivotally mounted in an occupant compartment of the vehicle.

10. The roller D-ring according to claim 1, wherein at least one of the holding sections hold the roller while allowing the roller to be rotatable, the at least one holding section corresponding to the folding portion of the body; and the holding section has a recessed structure to receive the roller body.

11. The roller D-ring according to claim 1, wherein the folding portion of the body to hold the roller is bent toward an occupant compartment of the vehicle upon forming the folded structure.

12. A method for assembling a roller D-ring for a seat belt of a vehicle, comprising:

forming a flat-sheet-shaped D-ring body having a pair of closing sections;

forming a single opening provided between the pair of closing sections, to which the peripheral surface of a roller is exposed, the single opening being substantially symmetrical with respect to both an axis of the roller and a central line crossing the closing sections;

bending the flat-sheet-shaped D-ring body about a folding portion of the flat-sheet-shaped D-ring body through an angle predetermined to provide a seat, on which the roller is to be seated;

forming a roller body and a plurality of rolling sections unitarily and in one-piece on opposite sides of the roller body, a diameter of each rolling section being smaller than a diameter of the roller body; and inserting the roller into the bent body such that the roller is seated on the seat; and folding the flat-sheet-shaped D-ring body about the folding portion of the flat-sheet-shaped D-ring body body such that the closing sections contact each other, and a pair of spaced apart holding sections each formed at opposite sides of the single opening are entirely spaced apart by the single opening.

13. The method according to claim 12, further comprising:

bending the folding portion of the body toward an occupant compartment of the vehicle after execution of the folding.

14. The method according to claim 12, further comprising:

forming, at the body, a recessed forming section to provide a seat to seat the roller, prior to the bending a flat-sheet-shaped D-ring body.

* * * * *